May 29, 1956     W. KNOLL     2,747,407
APPARATUS FOR MEASURING THE PRESSURE OF FLUIDS
LOCATED WITHIN BODIES OF SOLID MATERIAL
Filed Feb. 6, 1953
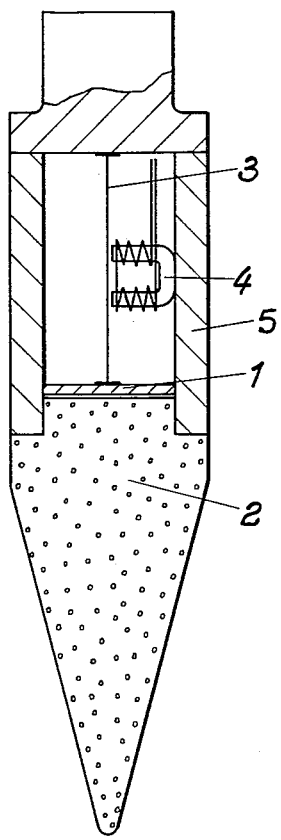
Inventor:
WERNER KNOLL
BY:

United States Patent Office 2,747,407
Patented May 29, 1956

2,747,407

APPARATUS FOR MEASURING THE PRESSURE OF FLUIDS LOCATED WITHIN BODIES OF SOLID MATERIAL

Werner Knoll, Hamburg, Germany, assignor to H. Maihak A. G., Hamburg, Germany

Application February 6, 1953, Serial No. 335,421

Claims priority, application Germany February 9, 1952

2 Claims. (Cl. 73—395)

The present invention relates to an apparatus for measuring fluid pressure.

More particularly, the present invention relates to an apparatus for measuring the pressure of a fluid located within a body of solid material, such, as, for example, the pressure of subterranean liquids or gases.

There are at the present time devices designed to indicate the pressure of a subterranean fluid, such as, for example, a liquid or gas located in the earth beneath a concrete structure or the like, but these known devices have thus far not proved to be satisfactory since they cannot be used under all circumstances and do not give good service for a long period of time.

One of the requirements of this type of apparatus is to measure the pressure of the fluid independently of the solid material surrounding the fluid, and up to the present time ceramic filters have been used to separate this fluid from the solid material to enable the pressure of the fluid to be measured, this ceramic filter being part of an apparatus which is embedded or driven into the ground or other solid material and which gives an indication of the fluid pressure through an electrical device. For example, the fluid acts on a yieldable membrane whose curvature is electrically indicated to indicate a fluid pressure. Such devices are not satisfactory for several reasons. For one thing the ceramic filter is quite brittle and therefore cannot be used at great depths and cannot be safely driven into all types of earth. Moreover the earth or other solid particles frequently clog the filter so that the pressure is inaccurately indicated, and also with known devices of this type there is a considerable time delay before the pressure is indicated.

One of the objects of the present invention is to overcome the above disadvantages by providing an apparatus with a filter which is strong enough to be driven into all types of earth to any desired depth without becoming injured in any way.

A further objects of the present invention is to provide a filter with pores small enough to prevent the filter from becoming clogged by particles of the solid material in which the filter is located.

Yet another object of the present invention is to provide a filter with pores small enough to draw a liquid through the filter by capillary action.

An additional object of the present invention is to provide a filter capable of being machined to very close tolerances.

Another object of the present invention is to provide a filter which may be located from a yieldable membrane by a distance small enough to enable a liquid to be drawn into the space between the filter and membrane by capillary action.

A still further object of the present invention is to provide a measuring apparatus which will give an instantaneous indication of the fluid pressure.

Still another object of the present invention is to provide a filter which guarantees protection of a yieldable membrane from the solid material in which the apparatus is located.

Also, the objects of the present invention include the provision of an apparatus whose original calibration and setting will remain accurate for an almost unlimited time.

With the above objects in view, the present invention mainly consists of an apparatus for measuring the pressure of a fluid located within a body of solid material, this apparatus including a support adapted to be located in the body of material, a membrane carried by the support for registering the pressure of the fluid in the body of solid material, and a filter mounted on the support and located opposite the membrane to protect the latter from the body of solid material, this filter being porous and made of metal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Referring now to the drawing, there is shown therein a hollow casing or support 5 which carries a membrane 1 forming an end wall of the casing and being surrounded by a rim of the latter which extends beyond the membrane 1, the latter being yieldable to an extent determined by the pressure of a fluid located against its outer face.

Fixed to the support or casing, opposite the membrane 1, is a filter 2 having the pointed shape shown in the drawing. This filter is made of a sintered, corrosion-resistant metal such as copper alloy or the like and is porous, the pores of the filter 2 being small enough to draw liquid therethrough by capillary action and being smaller than the smallest particles of earth so that the filter cannot become clogged. For example, the width of the pores of the filter may be on the order of 0.001 mm. The filter 2 is located from the membrane 1 by a distance small enough to draw liquid into the space between the filter and membrane by capillary action, the filter being spaced from the membrane by a distance on the order of 0.001 to 0.01 mm.

The extent to which the membrane 1 is curved indicates the pressure of the fluid, and this fluid pressure may be measured in any suitable way. In the example illustrated in the drawing, this measurement is produced through the medium of swingable, tensioned steel cord 3 which is connected at one end to the membrane 1 at the inner side thereof opposite from the filter 2. An electromagnet 4 is located opposite and closely adjacent to the cord 3, and the latter is set into a swinging motion by the energizing of the electromagnet 4. The amplitude and frequency of the swinging of the cord 3 will be dependent on the tension in the cord 3 which is controlled by the extent to which the membrane 1 is curved by the pressure of the fluid bearing against the outer face thereof, and, as is well known, the square of the frequency of the swinging movements of the cord 3 is proportional to the fluid pressure. The swinging of the cord is transmitted through the electromagnet to a suitable indicating device, in a known way, to electrically indicate the fluid pressure.

It is believed to be evident that the sintered metal filter is strong enough to guarantee protection of the membrane irrespective of the depth at which the apparatus is located, and also this filter may be safely rammed into all types of earth to any desired depth.

Morever, because the filter of the invention is made of metal it can be very accurately machined to close tolerances, and this obviously cannot be done with conventional ceramic filters.

A particular advantage of the structure of the invention resides in the fact that it may be immersed in water or the like before being inserted into the earth, so that upon insertion into the earth the pores of the filter as well as the space between the latter and the membrane are completely filled with liquid without any air or other gas being trapped in the pores of the filter or space between the latter and the membrane. Thus, it is impossible for the apparatus of the invention to give false readings because of a compressible gas located between the membrane and the liquid whose pressure is to be measured, and moreover any change in the liquid pressure is instantaneously determined without any inaccuracies produced, for example, by clogging of the filter pores.

It will be understood that each of the elements described above, or two or more together, may also find a useful application in other types of fluid pressure measuring apparatus differing from the types described above.

While the invention has been illustrated and described as embodied in apparatus for measuring the pressure of a fluid located within a body of solid material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for measuring the pressure of a fluid located within a body of solid material, comprising, in combination, a hollow support adapted to be located in the body of material; a membrane extending across and carried by said hollow support for sensing the pressure of the fluid in the body of solid material; transmission means in said hollow support operatively engaging said membrane for transmitting movements thereof with respect to said hollow support; and a filter mounted on said support and located opposite said membrane to protect the latter from the body of solid material, said filter being in the form of a solid body made of metal and having pores small enough to draw liquid through the filter by capillary action and said filter being spaced from said membrane by a distance small enough to draw liquid into the space between said filter and membrane by capillary action.

2. Apparatus for measuring the pressure of a fluid located within a body of solid material, comprising, in combination, a hollow support adapted to be located in the body of material; a membrane extending across and carried by said hollow support for sensing the pressure of the fluid in the body of solid material; transmission means in said hollow support operatively engaging said membrane for transmitting movements thereof with respect to said hollow support; and a porous metal filter mounted on said support and located opposite said membrane to protect the latter from the body of solid material, the pores of said filter being in the order of 0.001 mm. wide to draw liquid therethrough by capillary action and being smaller than the smallest particles of the solid material so that the pores of the filter cannot become stopped up by the solid material, said filter being spaced from said membrane by a distance on the order of 0.001 to 0.01 mm. to draw liquid into the space between said filter and membrane by capillary action.

References Cited in the file of this patent

UNITED STATES PATENTS

| | | |
|---|---|---|
| 2,007,324 | Budgett | July 9, 1935 |
| 2,132,095 | Broughton | Oct. 4, 1938 |
| 2,284,707 | Wilson | June 2, 1942 |
| 2,448,298 | Fligue | Aug. 31, 1948 |
| 2,521,107 | Wiley | Sept. 5, 1950 |
| 2,604,787 | Coyne | July 29, 1952 |
| 2,645,128 | Walker | July 14, 1953 |